Feb. 2, 1932.   R. MANCHA ET AL   1,843,691
STORAGE BATTERY LOCOMOTIVE
Filed July 3, 1930   2 Sheets-Sheet 1
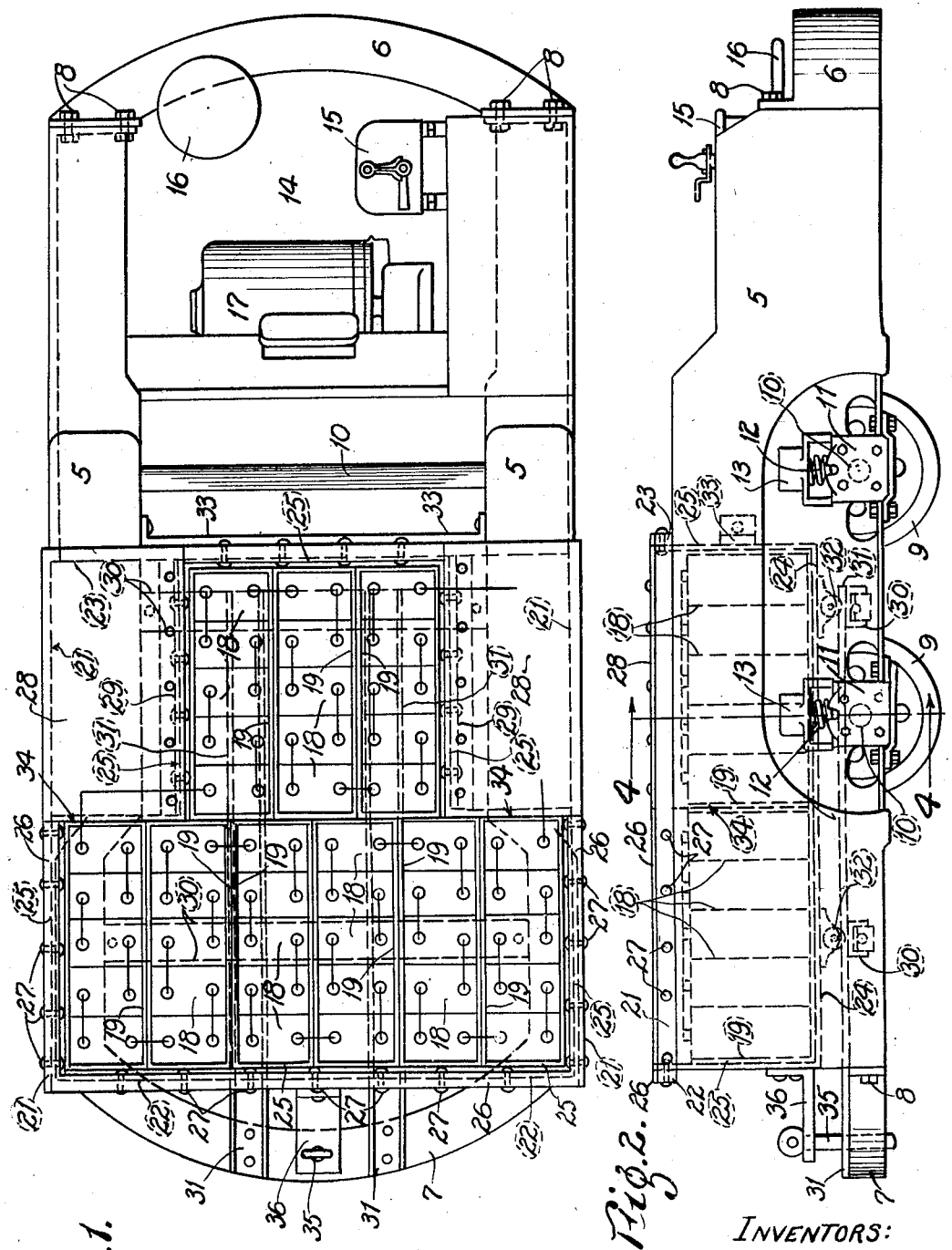
INVENTORS:
RAYMOND MANCHA
CHARLES E. STOLTZ.
By Albert J. McCauley
ATTORNEY Feb. 2, 1932. R. MANCHA ET AL 1,843,691
STORAGE BATTERY LOCOMOTIVE
Filed July 3, 1930   2 Sheets-Sheet 2

INVENTORS:
RAYMOND MANCHA
CHARLES E. STOLTZ
BY Albert J. McCauley
ATTORNEY

Patented Feb. 2, 1932

1,843,691

UNITED STATES PATENT OFFICE

RAYMOND MANCHA, OF ST. LOUIS, AND CHARLES E. STOLTZ, OF WEBSTER GROVES, MISSOURI, ASSIGNORS TO MANCHA STORAGE BATTERY LOCOMOTIVE COMPANY, OF ST. LOUIS, MISSOURI, A CORPORATION OF DELAWARE

STORAGE BATTERY LOCOMOTIVE

Application filed July 3, 1930. Serial No. 465,605.

This invention relates to storage battery locomotives, and the novel features are especially advantageous in low type locomotives.

Prior to this invention, low type locomotives have been used in coal mines to draw coal cars through shallow tunnels, or passageways, that are very low. The storage battery has been surrounded by the chassis of the low type locomotive, but a battery of this kind consists of numerous cells connected together, and the entire battery is very heavy, the weight being, for example, about two tons.

Owing to the weight of the battery, and the time required to disconnect and connect the numerous cells, the batteries in the old low type locomotives have not been removed for charging. It was necessary, or most economical, to charge the battery of an old low type locomotive without removing it from the chassis.

Consequently, when such low type locomotives were in continuous service, one would be idle for the charging of the battery while another was in service. In other words, two of the old low type locomotives were required to obtain the continuous service of a single locomotive.

An object of the present invention is to produce a low type locomotive wherein a novel chassis and two batteries are adapted to perform the work of two of the old low type locomotives.

More specifically stated, one of the objects is to produce a telescopic storage battery locomotive wherein a removable battery holder is telescoped with the chassis, and so supported in the chassis that the discharged battery can be easily and quickly removed and replaced by a fully charged battery.

In the preferred form of the invention, the chassis may include the usual, or any suitable, side and end frame members, in addition to a structure large enough and having the strength required to support the battery, this structure being telescoped with the chassis to locate the battery in the desired low horizontal plane.

In removing the battery, the chassis may be moved with respect to the battery holder, or said holder may be moved independently of the chassis, so as to provide the telescopic motion which separates the chassis from the battery and its holder. A similar operation is performed in substituting a charged battery for the discharged battery.

The bottom of the removable battery holder may be lower than the tops of the wheels which support the chassis, and the telescopic holder may be seated upon relatively low supporting members in the frame of the chassis.

To illustrate one form of the invention, we have shown a chassis provided with a recess open at one end to receive the battery holder, bars located in the bottom of said recess and forming part of the chassis structure, and a battery holder in the form of a carriage located between the side frames of the chassis and movable along said bars to permit removal of the battery. The battery and its holder are thus removably telescoped with the low chassis, and the weight of these removable elements is transmitted directly to the lower portion of the chassis structure.

With the foregoing and other objects in view, the invention comprises the novel construction, combination and arrangement of parts hereinafter more specifically described and illustrated in the accompanying drawings, where is shown the preferred embodiment of the invention. However, it is to be understood that the invention comprehends changes, variations and modifications which come within the scope of the claims appended.

Fig. 1 is a diagrammatical top view of a storage battery locomotive embodying the features of this invention.

Fig. 2 is a side view of the locomotive.

Figure 3:
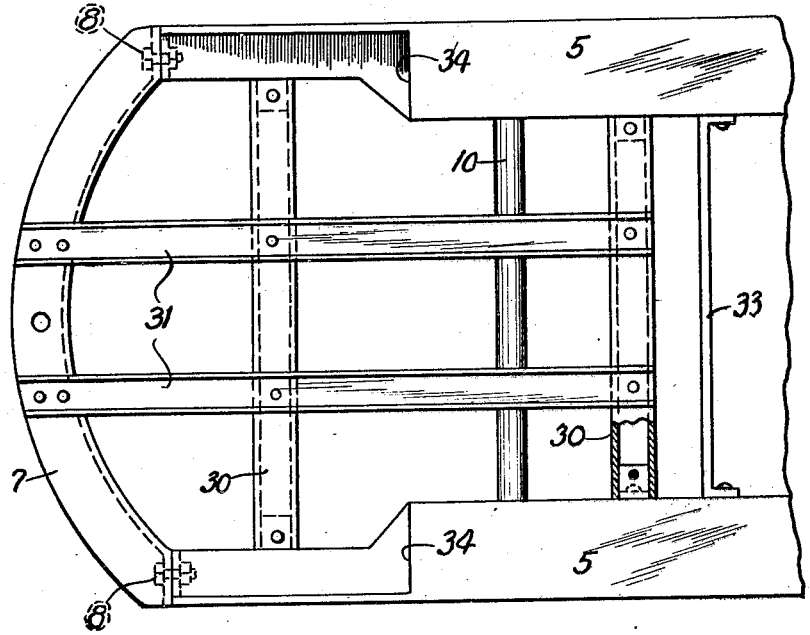
Fig. 3 is a top view of the front portion of the chassis with the battery holder removed.

To illustrate one form of the invention, we have shown a storage battery locomotive including a chassis provided with side frame members 5, and end members 6 and 7 connecting the side members. This chassis constitutes the body of the low locomotive.

The end members 6 and 7 may be termed end sills and they are adapted to serve as bumpers. These end members may be provided with the usual, or any suitable, coupling devices (not shown) to couple the locomotive to a car, or to another locomotive. The top faces of the end members 6 and 7 are preferably lower than the tops of the side members 5, as shown in Fig. 2. Bolts 8, or other suitable fastening devices, may be used to connect the ends of the members 6 and 7 to the ends of the side members 5.

The chassis is supported on wheels 9 provided with axles 10 extending into journal boxes 11. Springs 12 are interposed between the journal boxes and spring pockets 13 formed in the side frame members 5, so the chassis frame is yieldingly supported on the journal boxes.

An operator's compartment 14 (Fig. 1) is formed in one end of the chassis, said compartment being provided with a controller 15 and an operator's seat 16 adjacent to the controller. We do not deem it necessary to show the brakes, nor the other equipment under the control of the operator, as the invention is not limited to such details.

The locomotive is driven by an electric motor 17, and the driving power may be transmitted from the motor to the wheels in any suitable manner.

The storage battery which energizes the motor consists of numerous cells 18 connected together in series and, as previously stated, the weight of the complete battery is very great, for example, about two tons.

As shown by Figures 1 and 2, the battery is telescoped with the chassis, and the tops of the cells are preferably lower than the top of the low type chassis, while the bottom of the battery is lower than the tops of the wheels, and preferably adjacent to the axles 10.

The cells 18 are arranged in rows and each row is located in a tray 19, but owing to the numerous electrical connections and the weight of the contents of each tray, the batteries of the old low type locomotives have not been removed for charging. The batteries in old locomotives of this type have been charged while confined in the locomotives, and this has resulted in the use of two complete locomotives whenever continuous service of one low type locomotive was required.

The battery holder comprises a rectangular abutment frame including a pair of side bars 21 arranged longitudinally of the chassis and located above the top faces of the main side frame members 5, said longitudinal bars 21 being connected by transverse bars 22 and 23 to produce the rectangular frame.

The telescopic battery holder may be supported on the lower portion of the chassis and to illustrate this, we have shown a battery compartment comprising a bottom 24 on which the battery is seated, and side wall members 25 extending upwardly from said bottom and secured to the rectangular frame members 21, 22 and 23.

The battery compartment produced by the bottom and side wall members 24 and 25 may be approximately T-shaped, as shown in Fig. 1, so as to extend across the chassis at the front portion of the locomotive, where the vertical wall members 25 engage the frame members 21 and 22. At these parts of the structure, the wall members 25 have relatively narrow flanges 26 seated on the tops of the frame members 21 and 22, and rivets 27 may be employed to connect said vertical wall members 25 to said frame members 21 and 22.

Figure 4:
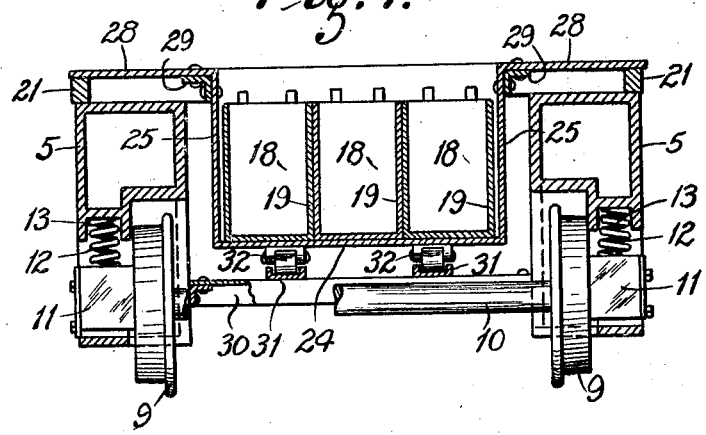
Fig. 4 is a vertical section taken approximately on the line 4—4 in Fig. 2.

However, at the intermediate portion of the chassis (Figs. 1 and 4), where the main side frames 5 are relatively wide to form the wheel housings, the battery compartment is narrower than at the front of the locomotive. As shown by Fig. 4, the vertical wall 25 at each wheel housing may be connected to a horizontal web, or flange, 28 which extends over one of the main side frame members 5, and this connection may be formed by an angle bar 29 attached to the top of the vertical wall 25 and also to the horizontal web, or flange, 28.

At the extreme rear of the approximately T-shaped battery compartment (Fig. 1), the vertical wall 25 of said compartment may be connected directly to the rear bar 23 of the rectangular frame, just as it is connected to the bars 21 and 22 at the front portions of the locomotive.

It will now be understood that the removable telescopic battery holder shown in the drawings includes a bottom 24 on which the battery is seated, and that this bottom lies below the tops of the wheels 9 and preferably above the axles 10. Said bottom is preferably surrounded by the main frame of the chassis, so as to support the battery in the horizontal plane of this low chassis.

The chassis is formed with a recess conforming to and adapted to receive the T-shaped battery holder, and this recess is open at the front end of the locomotive to permit removal of the battery holder and its contents.

The chassis shown in the drawings comprises transverse bars 30 connecting the lower portions of the side frame members 5 and longitudinal bars 31 supported upon said transverse bars. The longitudinal bars may be in the form of channels extending over the end member 7 to one end of the chassis, and they preferably lie above the axles 10 but below the tops of the wheels 9.

The battery holder is preferably supported on anti-friction members 32, which may be in the form of rollers secured to the battery holder and adapted to travel along the tracks or rails formed by the channel bars 31 which extend over the end sill 7 at the open end of the recess in the chassis, so the telescopic battery compartment can be easily removed from the chassis by moving said chassis along the tracks 31 to another pair of tracks, or to any suitable support alined with the tracks 31.

When the discharged battery is removed from the chassis, a charged battery in a similar holder is moved along the tracks 31 and substituted for the discharged battery.

When the locomotive is in service, the telescopic battery holder may be secured to the chassis by means of an abutment bar 33 adapted to engage the rear end of the battery holder, shoulders 34 formed on the side members 5 to engage the extended sides of the T-shaped battery holder, and a detachable locking device including a pin 35 passing through a member 36 extending from the battery holder and extending into the end frame member 7.

It will now be understood that the battery holder is supported by reinforcing members in the lower portion of the chassis, and that the several elements of the chassis and battery holder are so arranged that the low battery can be easily and quickly secured to and removed from the low chassis.

We claim:

1. A low type storage battery locomotive provided with a chassis frame constituting the body portion of the locomotive and including supporting members lower than the top of said frame, a storage battery from which energy is transmitted to drive the locomotive, and a holder for said battery, said holder being telescoped with said chassis frame and removably supported on said supporting members to permit removal of the battery.

2. A low type storage battery locomotive provided with a unitary frame for both the chassis and body of the locomotive, a storage battery from which energy is transmitted to drive the locomotive, and a removable holder for said battery, said removable holder being telescoped with said unitary frame to permit removal of the battery, the bottom of said removable battery holder being lower than the tops of the wheels of the locomotive, and said unitary frame being provided with supporting members located below said bottom to receive said battery holder.

3. A low type storage battery locomotive provided with a chassis frame constituting the body portion of the locomotive, a storage battery from which energy is transmitted to drive the locomotive, a removable holder for said battery, said holder being telescoped with said chassis frame, and the lower portion of said frame being provided with supporting members on which said battery holder is seated.

4. A storage battery locomotive comprising a low body provided with a storage battery from which energy is transmitted to drive the locomotive, an operator's station lower than the top of said battery, a removable holder for said battery, and means for telescopically supporting said removable holder in said low body, said means being lower than the tops of the wheels of the locomotive.

5. A low type battery locomotive provided with a chassis constituting the body of the locomotive and having a recess open at one end of the chassis to receive the storage battery and supporting members at the lower portion of said recess, and a battery holder telescoped with said chassis and seated on said supporting members to permit removal of the battery through said end of the recess.

6. A low type storage battery locomotive provided with a chassis constituting the body of the locomotive and having an approximately T-shaped recess to receive the storage battery and supporting members at the lower portion of said recess, said recess being open at one end of the chassis, and a battery holder conforming to said T-shaped recess, said battery holder being telescoped with the chassis and seated on said supporting members at the lower portion of the recess to permit removal of the battery through said end of the chassis.

7. A storage battery locomotive provided with a chassis, a storage battery from which energy is transmitted to drive the locomotive, an operator's station lower than the top of said battery, a removable holder for said battery, the bottom of said removable holder being lower than the tops of the wheels of the locomotive, said holder being telescoped with said chassis, and anti-friction members supporting said holder.

8. A storage battery locomotive provided with a chassis, a storage battery from which energy is transmitted to drive the locomotive, an operator's station lower than the top of said battery, a removable holder for said battery, the bottom of said removable holder being lower than the tops of the wheels of the locomotive, said holder being telescoped with said chassis, and anti-friction members supporting said holder, said anti-friction members being lower than the tops of said wheels but higher than the axles thereof.

9. A low type storage battery locomotive provided with a chassis frame constituting the body of the locomotive, a storage battery from which energy is transmitted to drive the locomotive, and a removable holder for said battery, said removable holder being telescoped with said chassis frame to permit removal of the battery, the bottom of said removable battery holder being lower than the tops of the wheels of the locomotive, said chassis frame including side frame members at opposite sides of said battery holder and transverse bars located below said bottom to support said holder.

10. A low type storage battery locomotive provided with a chassis frame having side members forming the sides of the locomotive body, a storage battery from which energy is transmitted to drive the locomotive, and a removable holder for said battery, said removable holder being telescoped with said chassis frame to permit removal of the battery, the bottom of said removable battery holder being lower than the tops of the wheels of the locomotive, said chassis frame including bars arranged longitudinally of the chassis and located below said bottom, and said battery holder being movable along said bars.

11. In a low type storage battery locomotive, a chassis constituting the body of the locomotive, said chassis being provided with an approximately T-shaped recess open at one end and having an abutment at the opposite end and supporting bars at the lower portion of said recess, said supporting bars being lower than the tops of the wheels of the locomotive but higher than the axles thereof, a battery comprising a group of cells from which electrical energy is transmitted to energize the locomotive, an approximately T-shaped removable holder containing said cells, said holder being movable through said open end of the recess so as to telescope with the chassis frame, anti-friction members carried by said battery holder and mounted on said supporting bars, and locking means cooperating with said abutment to prevent accidental displacement of said telescoped battery holder.

In testimony that we claim the foregoing we hereunto affix our signatures.

RAYMOND MANCHA.
CHARLES E. STOLTZ.